United States Patent [19]

Hausler

[11] Patent Number: 4,737,883

[45] Date of Patent: Apr. 12, 1988

[54] KEYBOARD FOR ELECTRICAL DEVICES

[75] Inventor: Ralph A. Hausler, Plymouth, Wis.

[73] Assignee: Illinois Tool Works Inc., Chicago, Ill.

[21] Appl. No.: 873,993

[22] Filed: Jun. 13, 1986

[51] Int. Cl.$^4$ ............................................. H05F 1/00
[52] U.S. Cl. .................................................. 361/220
[58] Field of Search ...................... 361/212, 215, 220;
174/68 A, 102 SC; 252/512-514

[56] References Cited

U.S. PATENT DOCUMENTS 4,301,040 11/1981 Berbeco ......................... 361/212 X Primary Examiner—L. T. Hix
Assistant Examiner—Brian W. Brown
Attorney, Agent, or Firm—D. J. Breh; T. W. Buckman

[57] ABSTRACT

A dielectric panel is provided for a keyboard in an electric device, such as a telephone, to block a disruptive high voltage charge of static electricity from passing from a human operator to the device. The panel comprises an electrically non-conductive clear slightly flexible plastic planar member and a dielectric coating or ink layer adhering to the underside of the planar member. The coating is applied by a screening process while in the liquid state and is then heat-dried. The coating comprises a mixture of clear polyester plastic (initially in a liquid state but hardened when dry), powdered aluminum, and a catalyst or agent which causes the powdered aluminum particles to be uniformly distributed and suspended in the plastic while the coating is being applied and hardened. The evenly distributed particles are electrically insulated from one another in the hardened coating to thereby improve the dielectric strength of the coating and panel. The coating, and other layers of conventional ink, are applied to selected areas of the underside of the planar member in such a manner as to provide printed information, to define clear windows through which underlying data can be seen, and to define touch-sensitive key areas. The coating and ink layers are protected from scratches by a sheet of clear pressure sensitive film.

19 Claims, 1 Drawing Sheet

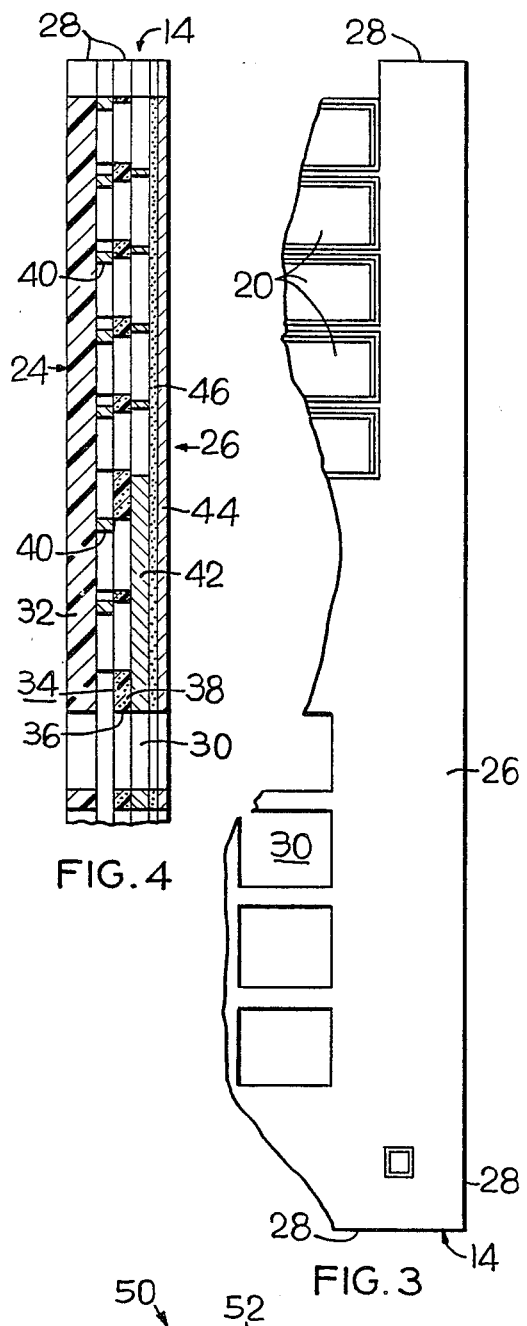
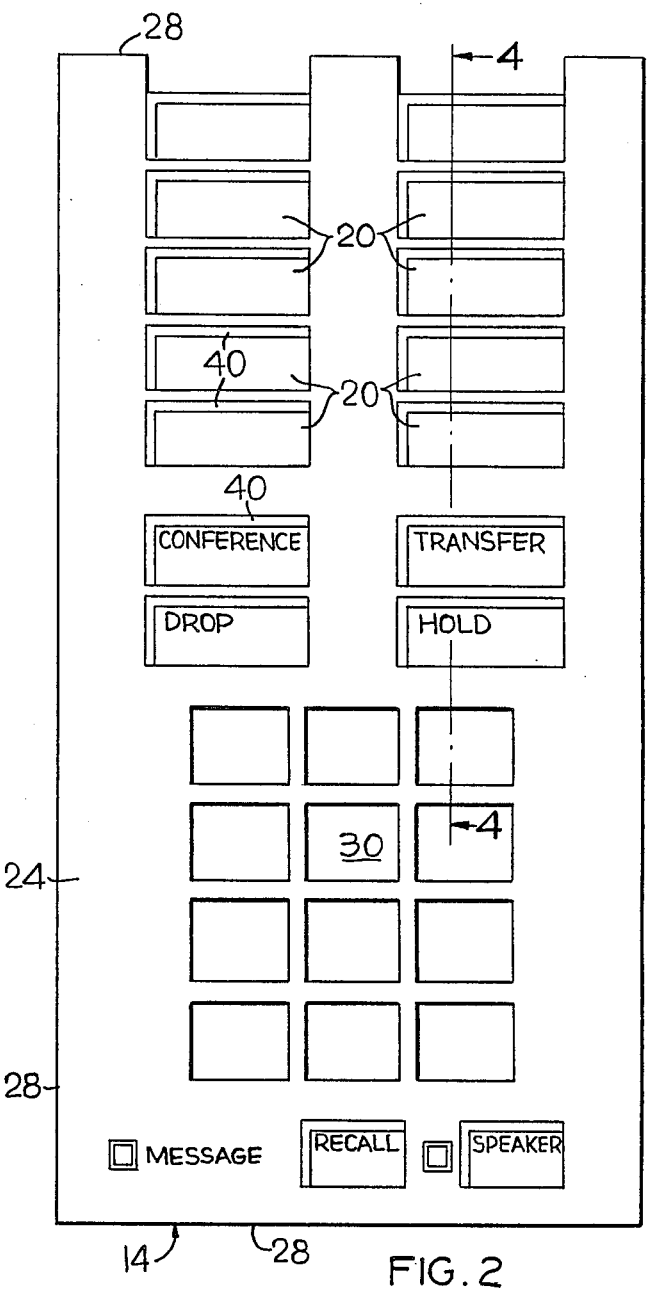
FIG. 5
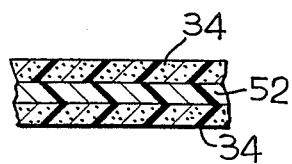
FIG. 6
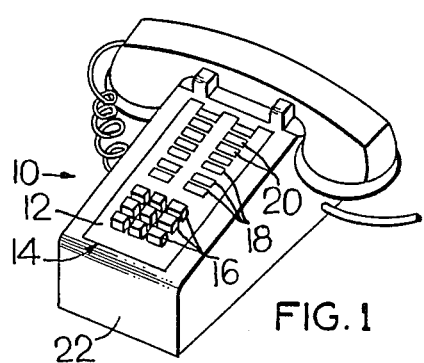
FIG. 1

KEYBOARD FOR ELECTRICAL DEVICES

BACKGROUND OF THE INVENTION

1. Field of Use

This invention relates generally to keyboards for electrical devices such as telephones, computers, calculators or the like.

In particular, it relates to keyboards comprising a dielectric panel having manually operable keys thereon or extending therethrough.

2. Description of the Prior Art

Some electrical devices can be adversely affected or will malfunction if a high voltage charge of static electricity is applied thereto, as when a human operator reaches out to manipulate the keys on the keyboard of the device. Typically, a static charge can build up as the operator moves about the room and can become quite high (on the order of 20,000 volts). Low humidity, carpeting and the operator's clothing contribute to the effect. The static charge can travel directly to the keyboard from the operator's fingers, from an object being held, such as a pencil, or from the operator's clothing, if it comes near the keyboard. Unless precautions are taken, the static charge travels through or around the keyboard panel to electrical components within the device, such as solid state devices, or electrical conductors connected to devices located within or remote from the device. In a phone system, for example, this can cause relays or circuit breakers to trip and results in a great deal of down time until they can be reset.

One commonly used method to avoid this problem is grounding the charge before it reaches the device. Thus, some devices are located on a grounding mat on a desk or table, or a large floor mat is provided at the operator's work station. The grounding mat bleeds off the static charge before it can be transferred to the device. However, such mats are relatively large, costly and can be unintentionally removed or displaced or otherwise rendered ineffective.

Another known method to avoid the problem is to employ a dielectric keyboard panel on the device to prevent the charge from reaching sensitive components. Thus, in some keyboards the keys are located on or project through a panel made of electrical insulating material such as plastic. Sometimes the panel takes the form of a flat transparent electrically non-conductive plastic sheet which has ink applied thereto in desired patterns. In some cases a layer of ink comprising electrically non-conductive clear plastic in which electrically conductive metal particles are suspended is applied to the plastic sheet to give the panel a metallic or flaked metal appearance. Such an ink layer is formulated of a mixture of very fine metal particles (such as aluminum flakes or powder) and a hardenable liquid plastic. The mixture is applied to the flat plastic sheet as a thin coating by brushing, spraying, printing or screening, and is then dried. However, prior art mixtures have not been entirely satisfactory because of the tendency of the metal particles to be non-uniformly suspended or to settle out or to clump together while the plastic is still in liquid form and during drying. Non-during drying. Non-uniform suspension of the electrically conductive particles substantially reduces the dielectric properties and effectiveness of the panel. More specifically, if the particles settle out or rise to the surface of the liquid plastic or cling to each other, as they tend to do when a conventional wetting agent or flow promoter is added to the mixture to facilitate application to the plastic sheet, they form an electrically conductive layer. However, it is extremely important that the coating be electrically non-conductive inasmuch as, when low-humidity conditions exist, as they do much of the time in northern climates, a static discharge will be conducted through the conductive ink layer or coating and into the associated electrical device. In a phone system, for example, this can cause relays or circuit breakers to trip and result in a great deal of down time until they can be reset. A high voltage static charge can flash over or flow through or around the coated panel and to the dvice with adverse affects.

SUMMARY OF THE PRESENT INVENTION

The present invention provides improved dielectric panels for use in keyboards of electrical devices which may be adversely affected or malfunction, if subjected to a charge of high voltage static electricity from a human operator or some other source. The improved panel is adapted to be mounted on the device in a location accessible to a human operator and has a front side facing the operator, a rear side confronting the device, and lateral edges by means of which it is secured to the device as by extrapment on a plastic housing of the device. The improved panels comprises a planar member or substrate made of the planar member is provided with an improved thin dielectric coating or metallic ink layer to give the panel a metallic appearance. The coating or ink layer in accordance with the present invention (hereinafter referred to as a "coating") adheres to the planar member and, when dry, takes the form of hardened electrically non-conductive plastic in which electrically conductive particles embedded in the hardened plastic. The particles are evenly and uniformly suspended in and distributed throughout the hardened plastic and are electrically isolated from one another by the hardened plastic. This arrangement of particles substantially reduces the tendency of a high voltage static charge from passing transversely through the coating and through the planar member to the device, or from being conducted through the coating along the surface of the planar member to the device, or through the coating and around the lateral edges of the planar member to the device. In effect, the improved coated panel functions as a static shield with no ill effects to the device.

The improved coating, while in liquid form, is applied to a surface of the planar member in any suitable manner, as by brushing, spraying, offset or gravure printing, but is welladapted to be applied by a screening process, such as silkscreening or the like. The improved coating, in liquid form, comprises a mixture of specified amounts or proportions of electrically conductive particles (such as metal powder or flakes), hardenable liquid plastic, and a liquid catalyst or agent, hereinafter defined, which operates to evenly disperse, distribute and suspend the particles throughout the plastic while the plastic is in the liquid state and during and after drying. During drying and hardening, certain constituents of the plastic and the agent evaporate.

The electrically non-conductive planar member in the panel may be opaque, translucent or transparent and may be rigid or flexible (as when used for membrane-type switch panels). The coating may comprise clear or translucent plastic, untinted or tinted with suitable and compatible coloring pigments, or may be opaque. The coating may comprise electrically conductive particles in the form of powdered metals of various kinds, such as aluminum powder. The coating may be applied to either or both sides of the planar member and may be dried and hardened in various ways i.e., air-dried, oven-dried or blower-dried. The planar member may have printing or other indicia applied directly to either side using suitable inks. The improved coating may be applied over or under such suitable inks.

A panel and its coating in accordance with the invention offers several advantages over the prior art. For example, the superior dielectric properties of the hardened coating substantially reduce the risk of damage to or malfunction of the associated electrical device caused by high voltage static charges. The even distribution and suspension of the electrically conductive particles in the mixture of which the coating is formed ensures more consistent electrical performance in a production run of many panels and provides more uniformity in appearance. The mixture, including the catalyst or agent therein, comprises commercially available constituent ingredients and is relatively simple to formulate and mix. The powdered metals in the mixture do not settle out while the plastic is still in liquid form or during and after drying and the "pot-life" of a given batch is increased. Since the coating is much more effective in resisting the flow or flash-over of a static charge, the associated electrically insulating planar member (plastic sheet) can be made of thinner material or flexible material, thereby enabling wider application of the panel, as for use in touch-sensitive membrane type keyboards. Application of the coating to embossed or domed areas of the planar member does not detract from its electrical performance. Other objects and advantages of the invention will hereinafter appear.

DRAWINGS

FIG. 1 is a perspective view of an electrical device in the form of a telephone having a keyboard panel in accordance with the invention;

FIG. 2 is an enlarged plan view of the front side of the panel shown in FIG. 1;

FIG. 3 is a plan view of a portion of the rear side of the panel shown in FIGS. 1 and 2;

FIG. 4 is a greatly enlarged cross section view taken on line 4—4 of FIG. 2 and showing the construction of the panel depicted in FIGS. 1, 2 and 3;

FIG. 5 is a greatly enlarged cross section view of a portion of a panel in accordance with the invention and comprising a planar member having a coating in accordance with the invention applied to one side thereof; and FIG. 6 is a view similar to FIG. 5 of a portion of another panel in accordance with the invention and comprising a planar member having a coating in accordance with the invention applied to both opposite sides thereof.

DESCRIPTION OF PREFERRED EMBODIMENTS

Referring to FIG. 1, numeral 10 designates an electrical device, such as a telephone, having a keyboard 12 which comprises a panel 14, depressible plastic keys 16 extending through the panel, touch sensitive keys 18, and back-lit display windows 20. Telephone 10 comprises a plastic housing 22 to which panel 14 is secured, by entrapment along the lateral panel edges in a conventional manner. Telephone 10 is understood to be of a type which can be adversely affected electrically or malfunction if a high voltage charge of static electricity (on the order of 20,000 volts) is applied to components (not shown) within housing 12 from an external charged source, such as a human operator initially approaching or touching keyboard 12. Panel 14 is constructed in accordance with the invention and operates to prevent such a static charge from passing into housing 12 either through or across the panel or around the edges of the panel.

As FIGS. 1, 2, 3 and 4 show, panel 14, which is a preferred commercial embodiment of the invention, comprises a front side 24 (FIG. 2), a rear side 26 (FIG. 3), and lateral edges 28. Panel 14 comprises a plurality of openings 30 to accommodate the plastic keys 16 which extend therethrough (FIG. 1). Panel 14 is slightly flexible or deformable, as hereinafter explained, and a region thereon serves as a membrane type keyboard portion defining a plurality of touch-sensitive keys 18 whose actual switches (not shown) are located in housing 12 beneath installed panel 14. Panel 14 is constructed so that the display windows 20 are translucent or transparent so that display devices (i.e., lights or printed information, not shown) beneath the panel can be viewed by the operator.

As FIG. 4 shows, panel 14 comprises a planar member 32 having a coating 34 in accordance with the invention adhering to its underside. Planar member 32 takes the form of a sheet of electrically non-conductive clear flexible polycarbonate plastic on the order of seven (7) mils thick. The planar member 32 can be made of various materials, such as polyester, polycarbonate styrene, vinyl, acrylic, derivatives thereof, or the like. Coating 34 takes the form of a hardened electrically non-conductive (but slightly flexible) layer of clear polyester plastic 36 in which electrically conductive particles 38 are uniformly suspended and insulated from one another by the plastic 36. Coating 34 also includes an agent or so-called "catalyst" (not depicted) which effects uniform suspension of the particles 38 in the plastic 36 while the plastic is in the liquid state and during and after drying, as hereinafter explained.

Coating 34 is applied to a side of planar member 32 while the plastic 36 is in a liquid state, as by a brush, roller, spray-gun, suitable printing press (offset or gravure) or screenprinting apparatus (the latter being preferred in the embodiment shown), and is then dried and hardened. In a method of application by screen printing, the non-conductive aluminum ink or coating 34 was printed using screen mesh counts from 75 threads per inch to 490 threads per inch. The screen fabric can be silk, polyester, nylon, steel or the like.

The specific coating disclosed herein was oven-baked at about 150° F. for about one-half (½) hour. However, coating 34 can be dried by various means and methods, such as air drying for about 48 hours, or by exposure to heat in a temperature range between about 70° F. and about 250° F. for a time period ranging between about one (1) minute to fifteen (15) hours, depending on the method used (i.e., oven, hot air blower, microwave oven, conventional oven, infrared devices, etc.).

Referring again to FIGS. 2, 3 and 5, prior to application of coating 34, a first layer of conventional ink 40 is applied by screening through a stencil (not shown) to small defined areas of the underside of clear planar member 32 for the purpose of conveying information, for definition of area (as for the touch-sensitive keys 18 and around some sides of the windows 20) and for aesthetic reasons.

Coating 34 is applied by screening through a stencil (not shown) to the underside of planar member 32 when ink layer 40 is dry so as to cover only certain portions (i.e., leaving windows 20 uncovered) of the underside of planar member 32 and to overly portions of the first layer of ink 40 thereon. However, the major portion of the underside of planar member 32 is covered by coating 34. Coating 34 is dried before the following steps are carried out.

A second layer of conventional ink 42 is applied by screening through a stencil (not shown) and covers substantially all of the underside of coating 34, as well as the underside of clear planar member 32 in the region of the touch-sensitive keys 18 to render them opaque or at least translucent. Ink layer 42 provides contrast to ink layer 40 in regions where both are visible. The ink layers 40 and 42 could be any color and comprise conventional electrically non-conductive ink.

Finally, to protect second ink layer 42 against being scratched as while being mounted on housing 22 of telephone 10, a sheet 44 of flexible clear polyester plastic, on the order of two (2) mils thick is adhesively secured to the underside of ink layer 42 (when the latter is dry) by a layer of adhesive 46, such as a pressure sensitive adhesive which is part of sheet 44.

As will be understood, FIGS. 2, 3 and 4 depict a preferred commercial embodiment of a keyboard panel in accordance with the invention which is adapted for use with a specific electrical device 10. However, as FIG. 5 shows, in its most basic form, a panel 50 in accordance with the invention comprises an electrically non-conductive planar member 52 having a coating 34 in accordance with the invention on at least one side. FIG. 6 shows planar member 52 having a coating 34 on both sides.

Coating 34 comprises a mixture which is applied while in a liquid state to planar 32, and whereon it is hardened. The mixture generally comprises a liquid (but hardenable) plastic, such as polyester plastic; a powder comprising electrically conductive particles, such as 450 NL aluminum powder; and a catalyst or agent to effect even dispersion and suspension of the particles in the plastic while the latter is in the liquid and hardened states. The catalyst or agent comprises exylene, propylene glycol methyl ether acetate, and unreacted toulene diisocyanate monomer, all in liquid form. The agent or catalyst also contains conventional unrelated solvents or thinners. The agent or catalyst operates to keep the aluminum particles in suspension in the clear base and substantially out of touch with each other and prevents a static discharge from being conducted along or through the coating 34. The proportions by weight in the preferred embodiment are: about ten parts of liquid plastic, about one part aluminum powder, and about one part agent or catalyst. The agent or catalyst operates to keep the aluminum particles in suspension in the clear base and substantially out of touch with each other and prevents a static discharge from being conducted along or through the coating 34.

In tests, using a 20,000 volt static discharge gun and a ¼" aluminum plate grounded to the gun, the graphic overlay or coating 34 was placed 1/32 of an inch from the edge of the ¼" aluminum plate and the discharge gun ¼" was held above the coating 34. No conductivity was noted. However, when no catalyst or agent was added to the mix of plastic and aluminum powder used for a coating, the static discharge burned a hole through lexan plastic planar member 32.

In the specific embodiment tested, the mixture comprised:
1. 300 grams of 450 NL (non-leafing) aluminum powder available from: Atlantic Powdered Metals Inc., 225 Broadway, New York, N.Y. 10007
2. 3000 grams of R.H. 9600 polyester plastic (clear) available from: K.C. Coatings, 15555 West 108th Street, Lenexa, Kans. 66219
3. 333 grams of catalyst or agent comprising 20% xylene, 20% propylene glycol methyl ether acetate, 1% unreacted toulene di-isocyanate monomer, and the balance of unrelated solvents or thinners available from: K.C. Coatings, 15555 West 108th Street, Lenexa Kans. 62219.

Alterations were made to the aforedescribed mixture for test purposes and showed that:
1. The amount of 450 (non-leafing) aluminum powder can be reduced to about 100 grams and raised to about 400 grams in the mix with no adverse effect. "Non-leafing" means that particles do not float to surface and form a conductive layer.
2. The amount of R.H. 9600 polyester plastic (clear) can be reduced to about 1000 grams and raised to about 5000 grams in the mix with no adverse effect. Tests also indicated that, if the mixture is altered, the silver coating will be more or less translucent depending upon the ratio of aluminum powder to clear plastic base. However, the mix becomes electrically conductive if the ratio of aluminum powder to the plastic base is too high.
3. The amount of agent or catalyst can be reduced to about 3% of total and raised to about 40% by weight. Variations alter the non-conductivity of the mix and also make the "pot life" of the mix longer or shorter, depending upon the proportion of catalyst or agent in the mix.

I claim:

1. A dielectric panel for a keyboard on an electrical device which may be adversely affected in its electrical performance if subjected to a charge of high voltage static electricity, said panel comprising:
   a planar member made of electrically non-conductive material and having opposite sides;
   and an electrically non-conductive coating adhering to at least a portion of at least one side of said planar member and comprising a hardened electrically non-conductive plastic and electrically conductive particles embedded in and evenly distributed throughout said hardened plastic, so that said particles are surrounded by said hardened plastic and electrically isolated from one another.

2. A panel according to claim 1 wherein said coating adheres to at least a portion of each of said opposite sides of said planar member.

3. A panel according to claim 1 or 2 wherein said coating further comprises an agent which effects and maintains even distribution and electrical isolation of said particles in said plastic while the latter is in the liquid state and while it is hardening.

4. A panel according to claim 1 or 2 wherein said planar member is flexible and said coating is flexible.

5. A panel according to claim 1 or 2 wherein said planar member is made of plastic.

6. A panel according to claim 5 wherein said planar member is transparent.

7. A dielectric panel for a keyboard on an electrical device which may be adversely affected in its electrical performance if subjected to a charge of high voltage static electricity, said panel comprising:
 a planar member made of electrically non-conductive plastic and having opposite sides;
 an electrically non-conductive coating adhering to at least a portion of at least one side of said planar member and comprising a hardened electrically non-conductive plastic, electrically conductive particles embedded in, evenly distributed and electrically isolated throughout said hardened plastic, and an agent which effects and maintains said even distribution of said particles in said plastic while the latter is in a liquid state and while it is hardening so that said particles are surrounded by said plastic and remian electrically isolated from one another.

8. A panel according to claim 7, wherein said coating is opaque, and wherein said planar member is translucent so that light can pass through a poriton of said planar member not covered by said coating.

9. A panel according to claim 8 including a first layer of ink on at least a portion of said one side of said planar member, and wherein said coating overlies uninked portions of said planar member and overlies poritons of said layer of ink.

10. A panel according to claim 9 including a second layer of ink overlying poriton of said coating and overlying uncoated portions of said planar member.

11. A panel according to claim 10 including a layer of translucent flexible plastic overlying and adhering to said second layer of ink to protect the latter against scratches.

12. A panel according to claim 11 wherein said layer of translucent flexible plastic is secured by pressure sensitive adhesive.

13. A panel according to claim 10 wherein said planar member is flexible.

14. A panel according to claim 10 or 11 or 12 or 13 which is provided with at least one hole therethrough to accommodate a key of said keyboard.

15. A panel according to claim 3 wherein said agent comprises: xylene, propylene glycol methyl ether acetate, and unreacted toulene di-isocyanate monomer.

16. A panel according to claim 15 wherein said agent comprises: about 20% xylene, about 20% propylene glycol methyl ether acetate, and about 1% unreacted toulene di-isocyanate monomer.

17. A panel according to claim 15 or 16 wherein the proportion by weight of said agent to the weight of total mixture is about 3% to about 40%.

18. A panel according to claim 15 or 16 wherein the proportion by weight of said agent to the weight of total mixture is about 10%.

19. A panel according to claim 15 or 16 wherein the proportions by weight are about ten parts of said liquid plastic, about one part of said powder, and about one part of said agent.

* * * * *